United States Patent [19]

Palmer

[11] Patent Number: 4,469,941
[45] Date of Patent: Sep. 4, 1984

[54] PARALLEL-IN, SERIAL-OUT FIBER OPTIC IMAGE SCANNER

[75] Inventor: John P. Palmer, Pomona, Calif.

[73] Assignee: General Dynamics, Pomona Division, Pomona, Calif.

[21] Appl. No.: 358,498

[22] Filed: Mar. 15, 1982

[51] Int. Cl.³ .......................... H01J 5/16; G02B 5/16
[52] U.S. Cl. ................... 250/227; 350/96.15; 350/96.25; 358/200
[58] Field of Search ...................... 250/227; 350/96.15, 350/96.16, 96.24, 96.25; 455/605-608, 610-612; 358/200, 206-207

[56] References Cited

U.S. PATENT DOCUMENTS

| | | |
|---|---|---|
| 1,697,941 | 1/1929 | Von Glowacki . |
| 2,309,117 | 1/1943 | John . |
| 2,648,249 | 8/1953 | Canada . |
| 3,036,153 | 5/1962 | Day ......................... 350/96.24 X |
| 3,167,612 | 1/1965 | Strickholm . |
| 3,192,391 | 6/1965 | Ressler . |
| 3,210,462 | 10/1965 | Trott . |
| 3,240,106 | 3/1966 | Hicks, Jr. . |
| 3,255,357 | 6/1966 | Kapany et al. . |
| 3,272,063 | 9/1966 | Singer, Jr. . |
| 3,325,594 | 6/1967 | Goldhammer et al. . |
| 3,363,103 | 1/1968 | Fowler et al. . |
| 3,365,580 | 1/1968 | Cannella . |
| 3,401,232 | 9/1968 | Goldhammer et al. . |
| 3,567,847 | 3/1971 | Price ............................... 358/200 X |
| 3,576,430 | 4/1971 | Fickenscher et al. ........... 250/227 X |
| 3,827,075 | 7/1974 | Baycura ....................... 350/96.24 X |
| 4,212,516 | 7/1980 | Sawamura ....................... 250/227 X |

Primary Examiner—David C. Nelms
Assistant Examiner—Edward P. Westin
Attorney, Agent, or Firm—Henry M. Bissell; Edward B. Johnson

[57] ABSTRACT

An optical image scanner utilizing an integral array of fiber optic launch couplers to direct an input light image to a selectively reflective termination and then to an output termination. The selectively reflective termination is sequenced to scan the bidirectional fibers of the launch coupler array to direct, in turn, the light transmitted through the launch coupler to the output. Thus, an input light image, applied in parallel, is scanned to develop a serial output for the respective pixels of the image. In one particular arrangement in accordance with the invention, the selectively reflective termination comprises an array of binary driven Faraday rotators. In an alternative arrangement, the reflective scanner comprises a rotating disc with a single reflective spot positioned near the periphery and facing the terminal ends of the bidirectional fibers of the launch coupler array. In still another arrangement, the reflective scanner comprises a liquid crystal array and the image scanner is combined with a CCD register for signal storage and readout.

19 Claims, 10 Drawing Figures

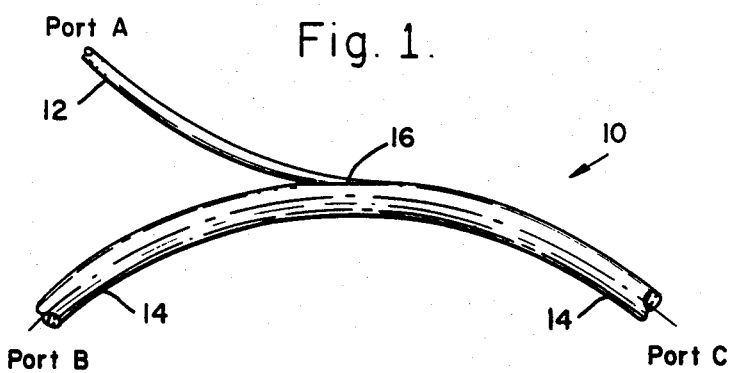
Fig. 1.
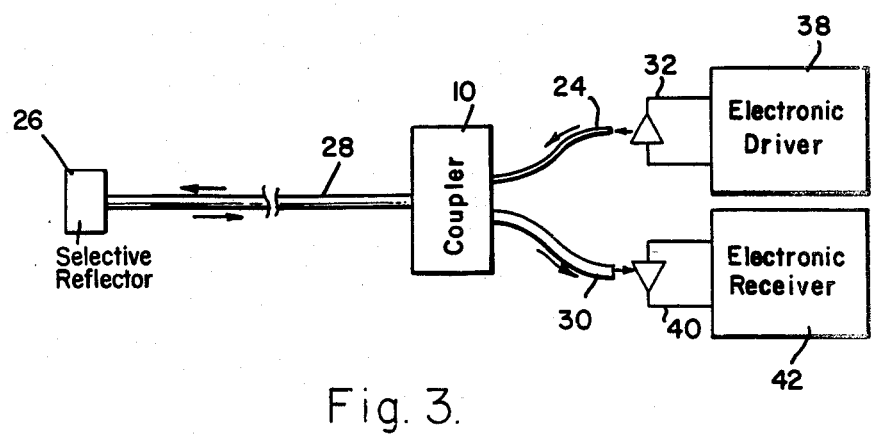
Fig. 2.
Fig. 3.

PARALLEL-IN, SERIAL-OUT FIBER OPTIC IMAGE SCANNER

BACKGROUND OF THE INVENTION

1. Field of the Invention

This invention relates to optical image scanning systems and, more particularly, to such systems utilizing fiber optic coupling arrays.

2. Description of the Prior Art

Image scanners have long been known in the prior art. For example, the Nipkow disc, invented in 1884, was used in electromechanical precursors of the modern television system.

The field of fiber optics is now well established, and a variety of fiber optic scanning devices have been developed. Examples of fiber optic scanning apparatus may be found in the disclosures of the Goldhammer et al U.S. Pat. Nos. 3,401,232 and 3,325,594 and in other U.S. Pat. Nos. to Ressler, 3,192,391; Strickholm, 3,167,612; Day, 3,036,153; Trott, 3,210,462; Kapany et al, 3,255,357; Cannella, 3,365,580; and Hicks, Jr., 3,240,106. The Trott patent, beginning at Col. 2, line 37, contains a good summary description of the properties of optical fibers and the use of fiber bundles or arrays for optical scanning. Singer, Jr. in U.S. Pat. No. 3,272,063 discloses a particular device which is useful in the preparation and handling of optical fiber bundles.

The present invention employs to particular advantage in an optical scanning system an integral array of substantially identical, fiber optic couplers. These couplers are of the unidirectional type, referred to as launch couplers, disclosed for example in my U.S. Pat. No. 4,307,933 entitled OPTICAL FIBER LAUNCH COUPLER, of which I am named as inventor with Phillip B. Ward, Jr. The fabrication of an array of such launch couplers is disclosed in U.S. application Ser. No. 333,955 filed Dec. 23, 1981, entitled FIBER OPTIC COUPLER ARRAY AND FABRICATION METHOD of John P. Palmer and Phillip B. Ward, Jr., assigned to the assignee of this invention. The disclosure of that application is incorporated herein by reference. In brief, an array of substantially identical launch couplers is fabricated by preparing first and second support blocks with pluralities of parallel grooves and placing appropriate optical fibers in the grooves. Each launch coupler comprises a launch fiber and a throughput fiber. Epoxy resin is applied to embed the respective fibers in their blocks and then the resin and embedded fibers are lapped to develop opposed mating planar surfaces. The launch fibers are lapped entirely through the cores to expose severed end surfaces of generally elliptical shape. The throughput fibers are lapped only deep enough to expose a corresponding surface of like extent and dimensions. The two blocks are then joined at the planar surfaces, and the array of launch couplers is aligned while applying light signals to the input ports of two launch fibers at opposite ends of the array and monitoring the light output at the output ports of the corresponding throughput fibers until the output is maximized. Preferred apparatus for use in the alignment procedure is disclosed in U.S. Pat. No. 4,302,267 entitled OPTICAL FIBER MATING APPARATUS AND METHOD of Palmer and Ward. Afterward the two blocks are affixed to each other by epoxy resin or other suitable adhesive. An array of launch couplers fabricated in this fashion can be used as the basis of an optical scanning system.

SUMMARY OF THE INVENTION

In brief, arrangements in accordance with the present invention incorporate a launch coupler array of the type just described in optical image scanning systems. In such an array, light energy applied to the launch fiber exits from the opposite throughput fiber end with about 1 dB of loss (the insertion loss) and with very little light appearing at the other throughput fiber end. However, light entering either throughput fiber end exists from the other throughput fiber end with only about 0.5 dB of loss (the throughput loss). For light applied to the throughput fiber, almost no light appears at the end of the launch fiber. With suitable fiber sizes and spacing, a single tier array of 50 couplers can fit in a volume of 1 inch long×0.5 inches high by 0.5 inches deep. Such tiers can be stacked to achieve corresponding volumetric efficiency with many thousands of individual launch coupler elements.

In the present invention, such arrays are combined with selectively controlled optical reflectors to develop an optical scanning system. The use of a single launch coupler of the type employed in the present invention has been disclosed in my prior U.S. Pat. No. 4,310,905 entitled ACOUSTICAL MODULATOR FOR FIBER OPTIC TRANSMISSION. Briefly, a reflector is positioned adjacent that end of the throughput fiber which is opposite the input port of the launch fiber. Thus, the portion of the throughput fiber between the coupler and the reflector serves as a bidirectional transmission path for light traversing the coupler. By controlling the optical reflectors to reflect light for only one fiber of the coupler array at a time, and by shifting the reflectivity of the reflectors in sequence, the light image applied to the launch fibers is scanned, fiber element by fiber element, and directed to the common output of the bundled output fibers.

BRIEF DESCRIPTION OF THE DRAWING

A better understanding of the present invention may be had from a consideration of the following detailed description, taken in conjunction with the accompanying drawing in which:

FIG. 1 is a schematic representation of a single launch coupler employed in arrangements of the present invention;

FIG. 2 is a drawing of a plurality of such couplers in an integral array;

FIG. 3, is a schematic block diagram illustrating a single fiber optic system, the principles of which are employed in the present invention;

DESCRIPTION OF THE PREFERRED EMBODIMENTS

Figure 4:
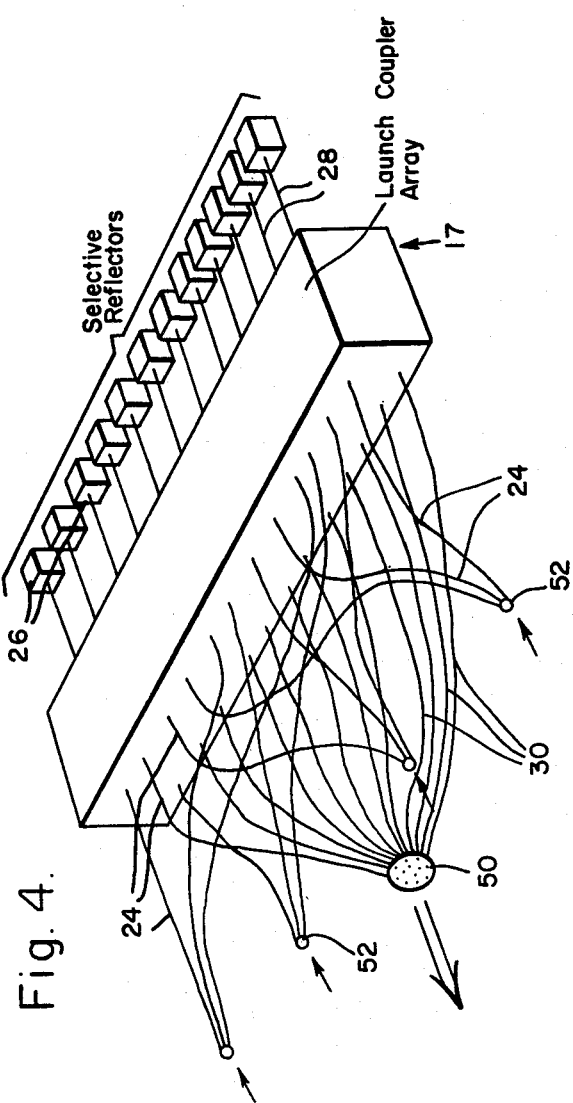
FIG. 4 is a schematic representation of a simplified embodiment exemplifying the present invention.

In the schematic diagram of FIG. 1, a launch coupler 10 of the type utilized in the present invention is shown comprising a launch fiber 12 and a continuous throughput fiber 14. It will be noted that the launch fiber is preferably smaller in diameter than the throughput fiber. In preparation of the launch coupler, both fibers 12 and 14 are mounted in appropriate grooves on respective block (not shown), embedded in epoxy, and then respectively lapped to develop optically flat, planar surfaces. The depth of lapping of the launch fiber is sufficient to completely sever the fiber core. The other portion of the launch fiber 12 is omitted from the diagram for the sake of simplicity, since it is not used. The throughput fiber 14 is lapped to a sufficient depth to develop an exposed surface of the fiber core which substantially matches the exposed surface of the severed launch fiber, and these two exposed surfaces are matingly joined at the coupling interface 16. The result is a three-port coupler which is particularly efficient as a unidirectional, of launch, coupler. Light entering Port A exits Port C with about 1 dB of insertion loss, while the light appearing at Port B is negligible. However, light entering either Port B or Port C exits the other port of the throughput fiber 14 with a throughput loss of about 0.5 dB and with almost no light appearing at Port A. An integrated array of such couplers, fabricated in accordance with the description set forth hereinabove, is particularly effective when used in arrangements in accordance with the present invention to develop fiber optics in optical image scanning systems.

Such an array is shown in FIG. 2 in the form of an assembly 17 comprising a base plate 18 having a plurality of holes, to facilitate mounting in alignment apparatus, and a pair of blocks 19, 20 to which pluralities of optical fibers 12, 14 are affixed. The lower block 20, to which the launch fibers are affixed, may be mounted to the plate 18 by any suitable means, for example by wax or adhesive (not shown). The upper block 19, to which the continuous throughput fibers 14 are affixed, is mounted to the upper surface of the block 20. Each of the blocks 19, 20 is fabricated with an optically flat mating surface lapped into a mound of epoxy resin, shown at 21, to expose the respective fiber cores as described above. These mating surfaces are secured together by a suitable adhesive, such as epoxy, having the desired optical properties. Each of the launch fibers 12 of the assembly 17 is aligned with and joined to a corresponding throughput fiber 14 to develop an individual launch coupler of the type shown and described with respect to FIG. 1.

Each of the blocks 19, 20 of the assembly 17 of FIG. 2 has an arcuate surface on the side facing the other block and a plurality of longitudinal grooves formed therein for receiving the respective optical fibers 12 or 14. These grooves are cut across the curved surface of the respective blocks, are evenly spaced relatively close together, and are of uniform depth. The depth is selected to correspond to the size of the optical fibers mounted in the grooves. Thus, lapping of the epoxy resin and all of the fibers on a given block to develop an optically flat planar surface and joining of the two blocks together at their flat surfaces results in an array of substantially identical, individual launch couplers like that shown in FIG. 1.

Launch coupler arrays are utilized in the present invention by placing the ends of the throughput fibers adjacent a reflective surface or a plurality of individually reflective elements. In the block diagram of FIG. 3, a single coupler 10 as in FIG. 1 is shown having an input fiber 24 coupled to the launch fiber Port A, a bidirectional fiber 28 coupled to Port C, and an output fiber 30 coupled to the Port B. Instead of couplings, these respective fibers may be actual extensions of the launch and throughput fibers, as indicated in FIG. 2. The input fiber 24 is positioned to receive input light signals from a photodiode 32 connected to be driven by an electronic driver 38. The bidirectional fiber 28 terminates adjacent a selectively reflective element 26 which, when reflecting, returns light incident upon it back to the bidirectional fiber 28 for transmission through the coupler 10 to the output fiber 30. The output fiber 30 is positioned to apply output light signals to a photodiode 40 which is coupled to an electronic receiver 42. Thus, the electrical signal generated by the driver 38 is converted at the photodiode 32 into a light signal which is applied through the coupler 10 and along the bidirectional fiber 28 to the reflective element 26. There the light signal is reflected or absorbed, depending upon the state of the element 26. If element 26 is reflective, the reflected light is transmitted back along the fiber 28 and the reflected light signal travels along fibers 28 and 30, is converted to electrical signals at the photodiode 40 and applied to the receiver 42.

A simplified array of such couplers and reflectors corresponding to the illustration of FIG. 3 is shown by way of example in FIG. 4, in which a small number of components are shown to illustrate the characteristics of an optical scanner of the present invention.

As shown in FIG. 4, the illustrative embodiment comprises an array 17 of launch couplers having launch or input fibers 24 coupled to throughput fibers extending between, or having extensions as, bidirectional fibers 28 and output fibers 30. Each of the bidirectional fibers 28 terminates adjacent a selectively reflective element 26 in the manner illustrated in FIG. 3. All of the output fibers 30 are gathered together to terminate in a single bundle 50, the light output of which may be applied to a photodiode in the manner indicated in FIG. 6. Although shown grouped together in bundles 52 of three fibers each, the input fibers 24 may be positioned individually adjacent respective light sources (for example a photodiode 32 as shown in FIG. 3.) Alternatively, each of the input fibers 24 may address an optical input element, such as a pixel of an image pattern. In general, however, the input elements may be arbitrary discrete sources.

Figure 5:
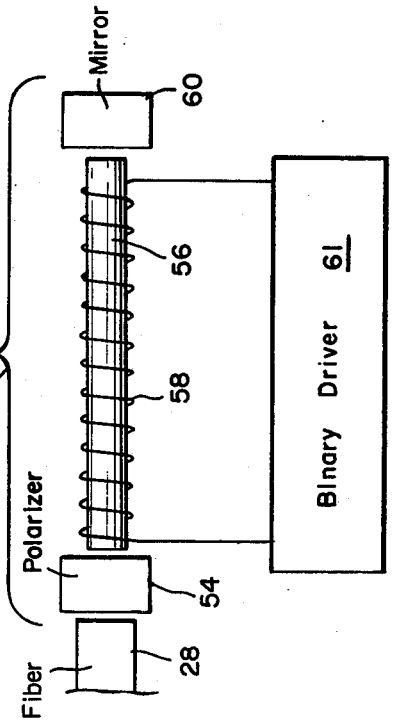
FIG. 5 is a block diagram illustrating one of the elements of FIG. 4.

Each of the selectively reflective elements 26 may be of the form illustrated in FIG. 5, which represents a Faraday rotator. This is shown in FIG. 5 as comprising a polarizer 54, a member 56 about which a coil 58 is wound, and a mirror 60. The coil 58 is coupled to a binary driver 61 so that the element 26 is controlled in binary fashion. The member 56 may be a glass rod, for example, or it may be a tube containing a suitable gas or vapor.

In operation of the device of FIG. 5, light from the bidirectional fiber 28 is polarized by the polarizer 54 and passes through the member 56 to the mirror 60. If a suitable magnetic field is established by current in the coil 58, the plane polarized light waves are rotated to the point where the light reflected from the mirror 60 cannot pass back through the polarizer 54. If the coil 58 is not energized, no rotation of the polarized light takes place and the reflected light passes back through the polarizer 54 to enter the bidirectional fiber 28.

Thus, in accordance with the binary operation of the reflective elements 26 in FIG. 4, the light coupled into a bidirectional fiber 28 from an input fiber 24 may be reflected back through the bidirectional fiber to the output fiber 30, or it may be blocked in the Faraday rotater, depending upon the status of the reflective element 26. If light emitted from a bidirectional fiber 28 is reflected back into the same fiber, then that light signal is coupled into the output fiber of that particular three-port launch coupler. Since all of the output fibers 30 are bundled to a common termination, the light from the bundle 50 is indicative of the input light condition of the single input light image of the single fiber 24 for which the corresponding element 26 is reflective. The device of FIG. 4 functions as an image scanner when the reflective elements 26 are rendered reflective in sequence. That is, only one of the terminations reflects at a given time. Consequently, the output signal from the bundle 50 is proportional to a single input pixel as addressed by the corresponding reflecting termination.

Figure 6:
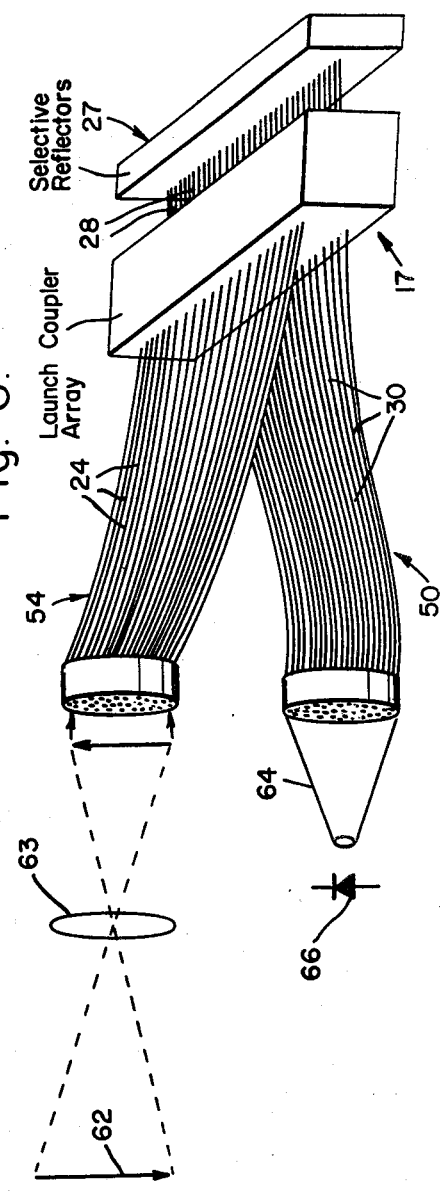
FIG. 6 is a schematic block diagram of one particular arrangement in accordance with the invention.

This may be illustrated more appropriately in FIG. 6 which shows the launch coupler array 17 having a plurality of input fibers 24 arranged in a bundle 54 and with the output fibers 30 arranged in a bundle 50. The bidirectional fibers 28 terminate in a selectively controllable reflective array 27. An image, represented by the arrow 62, is directed through a lens 63 to the face of the bundle 54. A tapered diffusion rod 64 adjacent the face of the output bundle 30 directs light to a photodetector 66.

Figure 7:
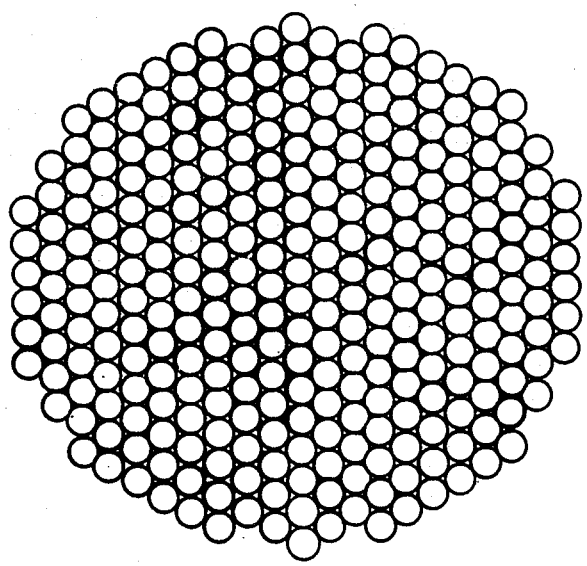
FIG. 7 is a diagram illustrating, in enlarged form, a particular portion of the diagram of FIG. 6.

FIG. 7 shows the appearance of the terminating face of fibers such as 24 or 30 of the bundles 54 or 50 of FIG. 6. For the input fibers 24, each of the round circles in FIG. 7 represents a pixel of the image to be scanned. Alternatively, the input fibers 24 can be oriented in generally circular fashion about the periphery of a hollow cylinder, in the manner of the Goldhammer et al scanner referenced above.

In the arrangement of FIG. 6, if an image pattern is focused on the end surface array of, for example, 1000 input fibers, then each of the 1000 bidirectional fibers 28 emits light at an intensity proportional to the intensity of the corresponding input pixel. However, only one of the bidirectional fiber termination elements 26 of array 27 is reflective at any given time; for example, assume that the element for pixel 923 is reflective. The current passing through the photodiode 66 is proportional to the image intensity for pixel 923. For the next sequential interval, pixel No. 924 is addressed by causing the associated reflective element No. 924 to become reflective (all others being non-reflective) and the current in photodiode 66 corresponds to the image intensity for pixel No. 924. By sequentially addressing each reflector element in the array 27, the image 60 is scanned and a sequential analog output string of signals is developed.

Figure 9:
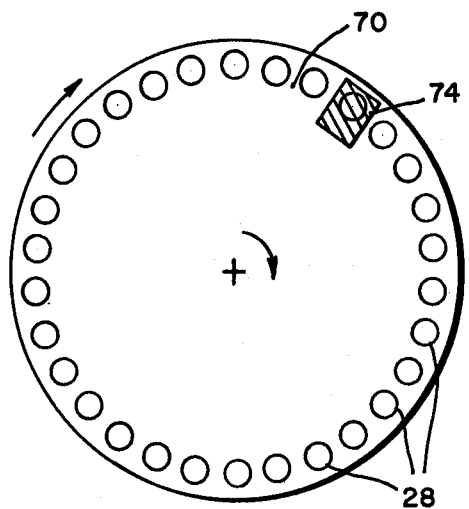
FIG. 9 is a diagram illustrating a portion of the arrangement of FIG. 8.
Figure 8:
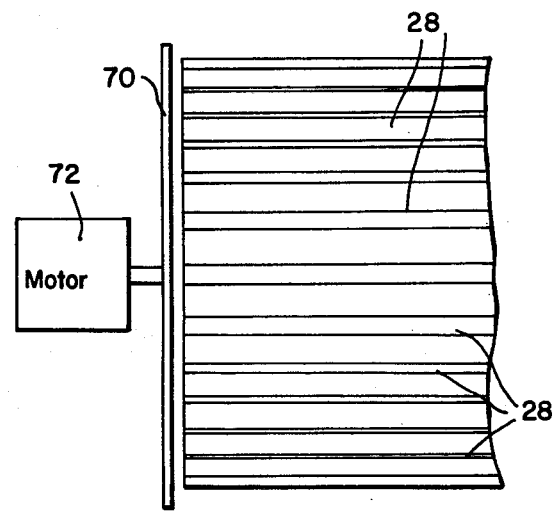
FIG. 8 is a diagram illustrating a portion of the embodiment of either FIG. 4 or FIG. 6 modified to develop an alternative arrangement of the present invention.

As an alternative to the Faraday rotator array 27 of FIG. 6, the scanning of the bidirectional fibers 28 may be effected by a rotating member, as illustrated in FIGS. 8 and 9. In the embodiment depicted in these figures, the fibers 28 are positioned as in the Goldhammer et al patent, and a wheel or disc 70 driven by a motor 72 is mounted facing the ends of the fibers 28. This disc 70 carries a single reflective spot 74 as shown in FIG. 9. As the disc 70 rotates, the spot 74 traverses the ends of the fibers 28, reflecting light back into the fibers 28, one at a time. Except for the reflective spot 74, the surface of the disc 70 is painted with an optically absorbing coating so that virtually no light is reflected therefrom. The area of the reflective region 74 is small enough so that it does not overlap two adjacent terminations, thus ensuring that only one termination is reflective at any given instant.

As a further alternative to the use of Faraday rotators in the array 27 of FIG. 6, the array 27 may comprise a liquid crystal reflective display having electrodes arranged in known fashion to develop control of the display through crosspoint selection in the manner of a dot matrix. Liquid crystal arrays are well known and various exemplary devices and their modes of operation are described in "The Illustrated Science and Invention Encyclopedia", Vol. 10, pages 1383–85. The liquid crystal arrays can be constructed with dimensions which are compatible with the dimensions of the optical fibers employed in the present invention. A further advantage of using a liquid crystal reflective array derives from its capability of operating at very low power levels and with low drive voltages.

Figure 10:
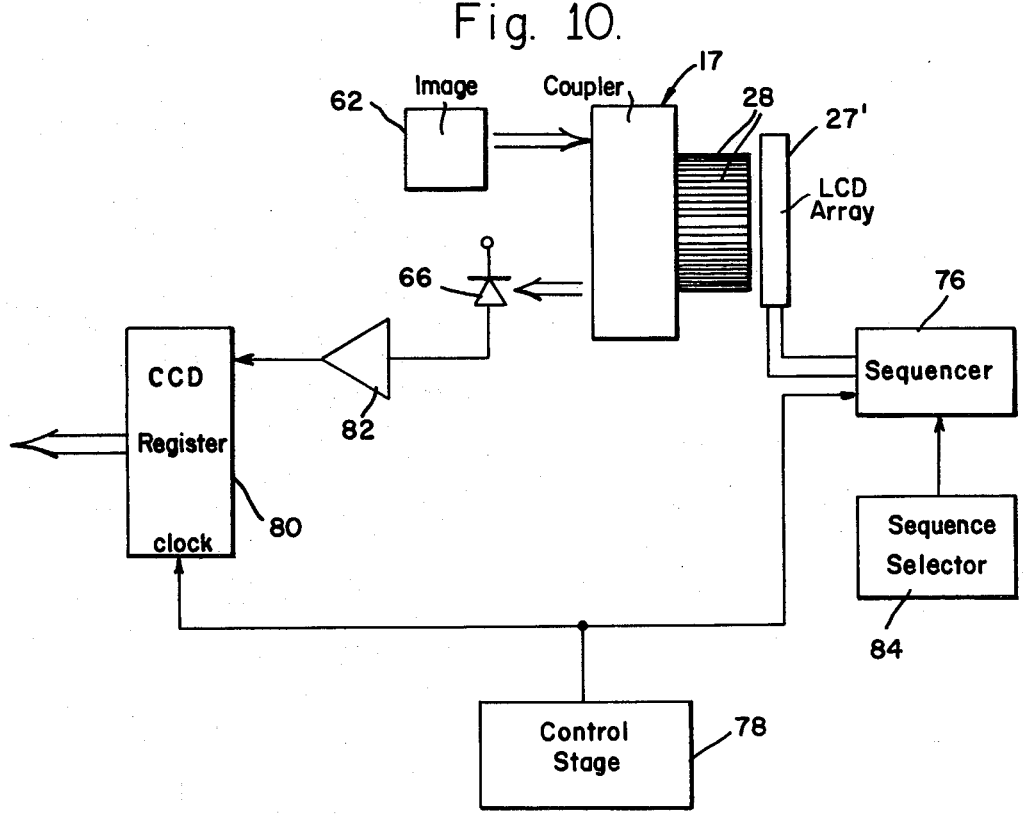
FIG. 10 is a schematic block diagram illustrating the incorporation of a variant of the structure of FIG. 6 in still another arrangement of the present invention.

FIG. 10 represents in schematic block diagram form an arrangement of the invention utilizing such a liquid crystal reflective array and coupled to drive a charge coupled device (CCD) for image storage. As shown in FIG. 10, the image 62 is applied through the coupler array 17 and thence to the bidirectional fibers 28. Liquid crystal reflective array 27' is positioned adjacent the ends of the fibers 28 to selectively reflect light back into the fibers under the control of a sequencer 76. Reflected light is directed back through the array 17 to a photodiode 66 positioned at the output. The sequencer 76 is driven in synchronism with the clock input to the CCD register 80 under the control of a timing reference in control stage 78. The photodiode 66 responds to output light from the image scanner, providing a signal to an amplifier 82 which is coupled to the signal input of the CCD register, where the scanned image is stored sequentially in known fashion. When desired, the stored image can be read out, again in serial fashion.

Charge coupled devices are well known in the art as being one form of charge transfer devices which can be operated to store and transfer analog signals. In general, a CCD stores charge in potential wells and move these wells along from electrode to electrode on a semiconductor substrate. By manipulating the charge along a series of electrodes, the CCD functions as a shift register. A typical three-phase CCD shift register is disclosed in U.S. Pat. No. 3,997,973 entitled TRANSVERSAL FREQUENCY FILTER of Buss.

The sequencer 76 of FIG. 10 may be operated in serial fashion, if desired, in the manner described above for the arrangement of FIG. 4. As an alternative, the sequencer 76 may be controlled from a sequence selector 84 to develop any sequence desired by the user. Thus, by programming sequence selector 84, the sequencer 76 may be controlled to drive the reflective array 27' to reflect light from the various pixels of the input image 62 in any selected order. For example, a sequence may be selected in which pixel one is followed by pixel three, followed by pixel five, etc. This could be particularly useful for color images (i.e., where multiple colors are selectively scanned).

Furthermore, the reflective array 27' can be driven by the sequencer 76 and selector 84 to produce optical mixing of the image pixels as they are directed to the serial output port. For example, the user may choose to generate the following sequence: pixel 1+ pixel 10, followed by pixel 2+ pixel 11, followed by pixel 3+ pixel 13, etc.; or any selected combination of pixels of the image 62 can be reflected by the array 27' at any given instant, thus enabling the scanner to function in the manner of an OR gate which is variable as to its inputs under the control of the sequencer 76 and sequence selector 84.

With operation of the arrangement of FIG. 10 in the manner described, the reflected light is converted by the photodiode 66 into a series of electrical signals which are stored in the CCD register in serial fashion. This series of stored signals can be read out of the CCD register 80 when desired in either serial or parallel fashion, depending upon whether a serial output port or parallel output port is utilized.

Although there have been described above specific arrangements of a parallel-in, serial-out, fiber optic image scanner in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A fiber optic image scanning system comprising:
   a plurality of unidirectional fiber optic couplers; each having an input fiber, a bidirectional fiber, and an output fiber and being effective to couple light signals from the input fiber unidirectionally to the bidirectional fiber in a first direction of light transmission with light tranversing the bidirectional fiber in a reverse direction being directed to the output fiber;
   means for applying light signals to the input fibers;
   selectively reflective means positioned adjacent the ends of the bidirectional fibers; and
   means for detecting light reflected from the selectively reflective means and transmitted to the termination of the output fibers for developing an electrical signal corresponding to the serial scanning of the applied light signals.

2. The system of claim 1 further comprising means for bundling the input and output fibers into discrete bundles, the output fibers being bundled to provide a common termination.

3. The system of claim 2 wherein the bundling means for the input fibers combine the input fibers by groups to develop a plurality of common input fiber terminations.

4. The system of claim 2 wherein the input fiber bundling means combines all the input fibers in a common bundle having a single input termination.

5. The system of claim 1 wherein the bidirectional fibers are positioned in a generally planar array and coupled to a like array of selectively reflective elements.

6. The system of claim 5 wherein each selectively reflective element is coupled to be driven by a binary control member.

7. The system of claim 5 wherein each selectively reflective element comprises a Faraday rotator coupled to a binary driver.

8. The system of claim 7 wherein the binary drivers of the respective Faraday rotators are operated in sequence to cause the Faraday rotators to reflect light, one at a time, in sequence.

9. The system of claim 1 wherein the selectively reflective means comprise a liquid crystal array of selectively reflective elements.

10. The system of claim 9 further including sequencing means coupled to selectively render the liquid crystal elements reflective in accordance with a predetermined sequence.

11. The system of claim 10 wherein the liquid crystal elements are rendered reflective in selected groups for the processing of light signals from the input fibers.

12. The system of claim 11 further including a storage register coupled to receive serially presented signals from the light detecting means for storage therein, and means for driving the register in synchronism with the sequencing means.

13. The system of claim 1 wherein the bidirectional fibers are arrayed in a generally cylindrical configuration and the selectively reflective means comprises a rotatable disc having portions about the periphery thereof in the region facing the bidirectional fibers which are alternately light reflective and light absorptive.

14. The system of claim 13 wherein the reflective portion corresponds to the extent of a single bidirectional fiber end and the remainder of the peripheral region of the disc is absorptive.

15. The system of claim 13 wherein the plurality of fiber optic couplers comprises a corresponding plurality of launch fibers of smaller diameter arrayed side by side on a first curved block and embedded in epoxy resin affixed to the block, a corresponding plurality of throughput fibers of greater diameter arrayed side by side along a second curved block and embedded in epoxy resin affixed to the second block, the epoxy resin of each of the blocks having a planar surface with at least portions of the cores of the respective fibers exposed at said surface, the launch fibers being severed and presenting bevelled end surfaces generally equal in extent and mating with the exposed core portions of the throughput fibers in the second block, the two blocks being joined together at their respective planar surfaces in optically coupling alignment between corresponding pairs of launch fibers and throughput fibers.

16. The system of claim 1 wherein the plurality of unidirectional fiber optic couplers comprises substantially identical couplers, at least a portion of which are arranged side by side in an integral array between respective support blocks including pluralities of grooves across respective arcuate surfaces with epoxy resin in place thereon to embed the respective fibers, the respective blocks being joined together at flat surfaces formed by lapping the epoxy resin and the fibers of the respective blocks to expose mating portions of the two sets of fibers comprising the couplers.

17. The system of claim 1 wherein each coupler is a launch coupler comprising a launch fiber of relatively smaller diameter embedded in epoxy resin on a first curved support block and having its coupling interface termination in the form of a bevelled end of the fiber coincident with a planar surface of the resin, and a throughput fiber or relatively greater diameter embedded in epoxy resin on a second curved support block with a portion only of the core of the throughput fiber being exposed coincident with a planar surface of the resin on the second block to develop a coupling interface for light from the launch fiber, the bevelled end of the launch fiber and the exposed planar surface of the throughput fiber being of substantially like extent and joined together in alignment for optimum coupling of light from the launch fiber to the throughput fiber.

18. The method of scanning a selected light image to develop a serial signal representation thereof including the steps of:
applying the light image to the input fibers of a plurality of unidirectional fiber optic couplers to develop light signals corresponding to respective portions of said image at corresponding terminations of bidirectional fibers extending from said couplers;
selectively reflecting the light signals back into the bidirectional fibers in sequence; and
detecting the reflected light signals at output fibers of said couplers.

19. The method of claim 18 wherein the image applying step comprises applying the image to the input fibers of an integral launch coupler array in which the plurality of fiber optic couplers comprises a corresponding plurality of launch fibers of smaller diameter arrayed side by side on a first curved block and embedded in epoxy resin affixed to the block, a corresponding plurality of throughput fibers of greater diameter arrayed side by side along a second curved block and embedded in epoxy resin affixed to the second block, the epoxy resin of each of the blocks having a planar surface with at least portions of the cores of the respective fibers exposed at said surface, the launch fibers being severed and presenting bevelled end surfaces generally equal in extent and mating with the exposed core portions of the throughput fibers in the second block, the two blocks being joined together at their respective planar surfaces in optically coupling alignment between corresponding pairs of launch fibers and throughput fibers.

* * * * *